(12) United States Patent
Teutenberg (10) Patent No.: US 11,460,380 B2
(45) Date of Patent: Oct. 4, 2022

(54) APPARATUS AND METHOD FOR PREPARING A SAMPLE MATERIAL

(71) Applicants: thyssenkrupp Industrial Solutions AG, Essen (DE); thyssenkrupp AG, Essen (DE)

(72) Inventor: Reinhard Teutenberg, Unna (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 1039 days.

(21) Appl. No.: 16/088,203

(22) PCT Filed: Mar. 27, 2017

(86) PCT No.: PCT/EP2017/057175
§ 371 (c)(1),
(2) Date: Sep. 25, 2018

(87) PCT Pub. No.: WO2017/167681
PCT Pub. Date: Oct. 5, 2017

(65) Prior Publication Data
US 2020/0300735 A1    Sep. 24, 2020

(30) Foreign Application Priority Data

Mar. 30, 2016 (DE) .................... 10 2016 205 243.8

(51) Int. Cl.
*G01N 1/28* (2006.01)
*B03C 1/30* (2006.01)

(52) U.S. Cl.
CPC .............. *G01N 1/286* (2013.01); *B03C 1/30* (2013.01); *G01N 2001/2866* (2013.01)

(58) Field of Classification Search
CPC .. G01N 1/286; G01N 2001/2866; B03C 1/06; B03C 1/28; B03C 1/30; B02C 23/08; B02C 23/10
(Continued)

(56) References Cited

U.S. PATENT DOCUMENTS

| 3,006,472 A | 10/1961 | Clute |
| 3,279,602 A | 10/1966 | Kottenstette et al. |

(Continued)

FOREIGN PATENT DOCUMENTS

| AU | 623154 B | 5/1989 |
| CH | 525 547 A | 7/1972 |

(Continued)

OTHER PUBLICATIONS

English translation of Office Action issued in Japanese Patent Application No. 2018-550833 dated Oct. 29, 2019.

(Continued)

*Primary Examiner* — Michael McCullough
*Assistant Examiner* — Molly K Devine
(74) *Attorney, Agent, or Firm* — thyssenkrupp North America, LLC (57) ABSTRACT

A method and apparatus for preparing a sample material includes comminuting the sample material in a comminuting device, supplying the sample material to a press to press the sample material, wherein the sample material is received on a press ram of the press, and generating a magnetic field and magnetizing iron particles contained in the sample material with a magnet, such that the iron particles accumulate in a region within the sample material facing toward the magnet.

20 Claims, 4 Drawing Sheets

(58) Field of Classification Search
USPC .................................. 209/3, 215, 216, 217
See application file for complete search history.

(56) References Cited

U.S. PATENT DOCUMENTS

| | | | |
|---|---|---|---|
| 3,318,447 | A | 5/1967 | Ellingboe, Jr. |
| 4,363,722 | A | 12/1982 | Dresty et al. |
| 4,726,813 | A | 2/1988 | Viscovich |
| 4,961,841 | A | 10/1990 | Andres |
| 5,714,063 | A | 2/1998 | Brunsting |
| 5,740,919 | A | 4/1998 | Stowe |
| 6,238,279 | B1 * | 5/2001 | Shau ............... B24B 37/04 451/60 |
| 6,242,932 | B1 | 6/2001 | Hembree |
| 9,409,185 | B2 * | 8/2016 | Manepalli .......... B02C 23/10 |
| 2004/0241033 | A1 * | 12/2004 | Ogawa ............... B22F 3/03 419/66 |
| 2007/0245851 | A1 * | 10/2007 | Sagawa ........... C22C 33/0278 249/117 |
| 2011/0220580 | A1 | 9/2011 | Danov |

FOREIGN PATENT DOCUMENTS

| | | |
|---|---|---|
| CH | 657 225 A | 8/1986 |
| CN | 88101371 A | 10/1988 |
| CN | 2109879 U | 7/1992 |
| CN | 101497059 A | 8/2009 |
| CN | 202037069 U | 11/2011 |
| CN | 202752099 U | 2/2013 |
| DE | 20 15 073 A | 10/1971 |
| DE | 25 35 745 A | 2/1977 |
| DE | 693 1 8 1 47 T | 11/1998 |
| DE | 197 37 161 A | 4/1999 |
| DE | 10 2007 049 182 B | 5/2009 |
| DE | 10 2013 106 998 A | 1/2015 |
| EP | 1 052 500 A | 11/2000 |
| EP | 2346612 B | 7/2011 |
| JP | S4923900 U | 6/1974 |
| JP | 03-504273 A | 9/1991 |
| JP | H 11-83688 A | 3/1999 |
| JP | 2003-010724 A | 1/2003 |
| JP | 2009-240846 A | 10/2009 |

OTHER PUBLICATIONS

English Translation of International Search Report issued in PCT/EP2017/057175, dated Jun. 15, 2017 (dated Jul. 5, 2017).
Bruker AXS Inc., "Slag Analysis by X-ray Fluorescence Spectrometry", (Sep. 18, 2009) p. 38-39.
Siebtechnik, "Automatic milling and pressing system AMP", (Jun. 1, 2013), p. 2.
Herzog, "HP-MA/HP-PA Pulverizing Mill and Pellet Press in Modular Design", (Jul. 7, 2014), p. 2-4.

* cited by examiner

Fig. 3

APPARATUS AND METHOD FOR PREPARING A SAMPLE MATERIAL

The invention relates to an apparatus and a method for preparing a sample material, in particular slag or ore, from a mineral or steel production process.

To monitor the steel or mineral production process, samples of, for example, slags or ores are typically taken at greatly varying points of the process and subsequently analyzed. The material samples taken are compressed to form a tablet, for example, for the subsequent analysis. A method for producing such a compressed tablet is known from DE 10 2013 106 998 A1.

Methods, for example, spectral analysis, in particular x-ray fluorescence analysis, are frequently used for the quantitative determination of the elementary composition of such material samples. Such subsequent analysis methods are interfered with in particular by iron particles located in the sample material, wherein these particles corrupt the measurement results. Crude iron is a ductile material, which is deformed or is not ground sufficiently finely during the preparation of the sample material and therefore makes subsequent analysis more difficult.

It is therefore the object of the present invention to provide an apparatus and a method for preparing a sample material which simplify an analysis of the elementary composition of the sample material.

This object is achieved according to the invention by a method having the features of independent method claim 1, and by an apparatus having the features of independent device claim 12. Advantageous refinements result from the dependent claims.

A method for preparing a sample material, in particular slag, cement, or ore, from a mineral, cement, or steel production process comprises the following steps according to a first aspect:

a. comminuting the sample material in a comminuting device,
b. supplying the sample material to a press device for pressing the sample material, in particular to form a tablet, wherein the sample material is received on a press ram of the press device,
c. generating a magnetic field and magnetizing iron particles contained in the sample material by means of a magnet device, such that the iron particles accumulate in a region within the sample material facing toward the magnet device.

Accumulate is to be understood to mean that the concentration of iron particles increases in the region facing toward the magnet device. For example, the iron particles accumulate directly at the magnet device. In particular, the iron particles accumulate exclusively in the region of the sample material facing toward the magnet device, wherein no or only a very small concentration of iron particles is present in the remaining regions of the sample material. The region facing toward the magnet device is preferably a peripheral region of the sample material, for example, a region of the surface.

The sample material includes, for example, industrial slags, which in particular in a steel production process. The sample material furthermore comprises, for example, ores. The sample material is taken from the production process and subsequently, for example, cooled and supplied to the comminuting device. The comminuting device is, for example, a roller mill, a vibratory disk mill, a vertical roller mill, a mill which operates according to the electromechanical comminuting principle, or a crusher. Following the comminuting device, the sample material is conducted to the press device, wherein the magnet device is arranged on the press device.

The press ram is arranged in a housing of the press device and is movable in relation to the housing. The sample material is preferably received on a head region of the press ram, which faces in the direction of the inlet in the press device. During a movement of the press ram toward a counter pressure plate, the sample material is compressed to form a tablet.

The magnet device is designed such that it generates a magnetic field which extends into the sample material. The magnetic field is preferably formed such that it magnetizes metallic iron particles having a size of >5 mm, preferably >1 mm, in particular >100 µm, most preferably less than 100 µm, and moves them in the direction of the magnet device. In particular, the magnet device is deactivatable, and therefore it does not generate a magnetic field.

Such a magnet device, by means of which a magnetic field can be generated, enables a reduction of the proportion of iron in the sample material in the press tool. The subsequent analysis of the sample material is thus simplified and reliable analysis results are achieved. Parameters of the cement, ore, or steel production process are subsequently changed accordingly if necessary, in dependence on these analysis results. The measuring surface for the analysis of a press tablet is typically in the middle on the surface of the press tablet, wherein the tablet is analyzed with a penetration depth of approximately 50-100 µm. The side facing away from the press ram is typically analyzed. Iron accumulated in the peripheral regions of the press tablet therefore has no or only a very minor influence on the measurement result.

According to a first embodiment, the iron particles are at least partially removed from the sample material. In particular, the iron particles are removed from the sample material following step c., wherein the sample material is compressed to form a tablet after the removal of the iron particles.

According to a further embodiment, step c. comprises the plunging of the magnet device into the sample material. The magnet device comprises, for example, a bar magnet, which is plunged into the sample material lying on the press ram. The iron particles accumulate on the bar magnet and are removed together with it from the sample material. The sample material is subsequently pressed by means of the press device to form a tablet.

According to a further embodiment, the magnet device magnetizes the press ram of the press device and the iron particles of the sample material accumulate in the peripheral region of the sample material facing toward the press ram. For this purpose, the magnet device is arranged at least partially around the press ram, for example. In particular, the press device has a housing and the press ram is arranged so it is movable inside the housing between a retracted position and a pressing position, and wherein a ring and a counter pressure plate are provided, which cooperate with the press ram in the pressing position. The press ram, the ring, and/or the counter pressure plate are preferably magnetized by the magnet device, wherein the iron particles accumulate within the sample material at a region which faces toward the press ram, the ring, and/or the counter pressure plate.

According to a further embodiment, the magnet device is moved from a position outside the press device into a position inside the press device before step c. A line for conducting the sample material is connected downstream of the comminuting device according to a further embodiment, wherein a further magnet device is attached to the line and wherein the sample material is conducted through the line following the comminuting device and the iron particles of the sample material accumulate on a wall region of the line. The further magnet device is designed in particular such that it generates a magnetic field inside the line. This enables a separation of the iron particles from the sample material before the entry of the sample material into the press device.

According to a further embodiment, the further magnet device is deactivated following the accumulation of the sample material on the wall region of the line, and therefore it does not generate a magnetic field. The iron particles accumulated on the wall region are preferably removed from the line and the sample material. The accumulated iron particles detach from the line and can be suctioned off, for example.

According to a further embodiment, the magnet device, the press device, and/or the line and in particular the sample material are vibrated. This ensures a better separation of the iron particles from the sample material.

According to a further embodiment, the comminuting device comprises a crusher device and/or a grinder device, and wherein a line for conducting the sample material having a further magnet device is connected downstream in each case from the crusher device and/or the grinder device, and wherein the sample material is conducted through the line following the grinder device and/or the crusher device and the iron particles are removed from the sample material. For example, a crusher device having a grinder device connected downstream is provided, wherein the crusher device and the grinder device are connected to one another, and therefore sample material is conducted from the crusher device to the grinder device.

The method according to a further embodiment, wherein the sample material is analyzed by means of an RFA and/or an RDA analysis following step c. An RDA analysis is to be understood as x-ray diffractometry, wherein RFA describes x-ray fluorescence analysis. RDA is additionally used, for example, to optimize and/or to adjust the magnet device, such that it has an optimum magnetic force. It is conceivable, for example, that the properties of the magnet device, for example, the current strength and/or the magnetic force, are adjusted in dependence on the crude iron content in the material sample ascertained by means of the RDA.

The invention furthermore comprises an apparatus for preparing a sample material, in particular slag or ore, from a mineral or steel production process, having at least one comminuting device for comminuting the sample material, wherein a press device for pressing the sample material, in particular to form a tablet, is connected downstream of the comminuting device and the press device has a press ram for receiving the sample material, wherein the press device has a housing and the press ram is arranged so it is movable inside the housing between a retracted position and a pressing position and wherein a ring and a counter pressure plate are provided, which cooperate with the press ram in the pressing position. Furthermore, a magnet device is provided, which is arranged such that iron particles contained in the sample material, the press ram and/or the ring, or the counter pressure plate and/or the ring are magnetizable by the magnet device, and therefore the iron particles accumulate in a peripheral region within the sample material.

The ring is formed from steel in particular and is arranged at the inlet region of the press device. The ring preferably rests on the housing in the region of the inlet. Before the pressing procedure, the ring is positioned on the housing and forms the press mold of the tablet together with the press ram and the counter pressure plate. The ring preferably spaces apart the housing of the press device from a counter pressure plate, toward which the press ram moves to compress the sample material to form a tablet. During a pressing procedure, the press ram is moved, for example by means of a hydraulic or mechanical lifting device, in the direction of the counter pressure plate in relation to the housing.

A magnetization of the press ram, the ring, the counter pressure plate, or combinations thereof causes a displacement of the iron particles within the sample material in the direction of the magnetized element. The iron particles are moved, for example by a magnetized press ram, in the direction of the press ram and accumulate at a peripheral region, preferably the region facing toward the press ram. During the compression of the sample material to form a press tablet, the iron particles remain in the peripheral region of the tablet, in particular the region facing toward the press ram, which substantially simplifies a subsequent analysis of the sample material, since the measuring surface is typically in the center, for example having a diameter of up to 30 mm, on the surface of the press tablet and the sample is analyzed with a penetration depth of approximately 50-100 µm. The side facing away from the press ram is typically analyzed. Iron accumulated in the peripheral regions of the press tablet therefore has no or only a very minor influence on the measurement result.

The advantages and explanations described with reference to the method for preparing a sample material also apply accordingly for an apparatus to the apparatus for preparing a sample material.

According to one embodiment, the magnet device comprises a permanent magnet or an electromagnet. The magnet device preferably comprises a plurality of permanent magnets and/or electromagnets, which are arranged in the form of a ring and/or in segments, for example. An electromagnet has at least one coil having a plurality of turns. The field strength of the magnetic field is adjustable in particular via the current strength. In the case of a permanent magnet, the field strength of the magnetic field at the sample material is adjustable, for example via the distance of the magnet device from the sample material. The magnet device is preferably attached so it is movable between a position outside the press device and a position inside the press device, in which the magnet device is connected to the sample material. In particular, the magnet device is plunged into the sample material, wherein the iron particles of the sample material are magnetized. In the position outside the press device, the magnet device does not interact with the sample material such that magnetization of the iron particles takes place. The magnet device is preferably attached so it is movable in the direction of the head region of the press ram and in relation thereto.

According to a further embodiment, the magnet device is arranged in the housing or on the counter pressure plate. A magnet device arranged in the housing is preferably arranged such that it magnetizes the press ram and/or the ring. The magnet device is preferably attached at the height of the press ram inside the housing of the press device. A magnet device attached to the counter pressure plate preferably magnetizes the counter pressure plate and/or the ring.

According to a further embodiment, a line for conducting the sample material is connected downstream of the comminuting device, wherein a further magnet device is attached on the line. The further magnet device is preferably attached on the outer circumference of the line. The line preferably comprises a material which is permeable to a magnetic field, for example silicone. In particular, exclusively a section of the line is formed from a material permeable to a magnetic field, wherein the magnet device is attached on this section. In particular, the magnet device is attached on the line such that it forms a section of the line. The magnet device is formed tubular for this purpose, for example. A magnet device on a line connected downstream of the comminuting device enables a separation of the iron particles from the sample material immediately following the comminuting and before the entry of the material into the press device.

The magnet device is arranged all around the line, in particular concentrically. A concentric arrangement of the magnet device all around the line causes a movement of the iron particles in the direction of the inner wall of the line, and therefore they are held there. This enables a reliable separation of the iron particles from the sample material. The magnetic field of the magnet device is preferably formed such that the iron particles are held on the inner wall of the line against the flow of the sample material and are separated from the sample material.

The magnet device is formed in a ring shape, for example. The ring-shaped magnet device is arranged, for example, around the line or the press ram of the press device. The magnet device preferably has a plurality of magnet segments, which are arranged to form a ring. For example, the magnet device comprises two half-ring-shaped segments. The magnet device comprises, for example, an electromagnet having at least one coil, which has a number of turns increasing in the flow direction of the sample material. The increasing number of turns generates a magnetic field which rises in strength in the direction of the flow direction of the sample material, wherein a separation of the iron particles from the sample material is reliably achieved. The electromagnet having the coil, which has an increasing number of turns in the flow direction of the sample material, is preferably arranged around the line. In particular, the magnetic gradient force of the magnetic field of the magnet device is adjustable. An adjustability of the gradient force enables an alignment of the movement of the iron particles. In addition, it is possible to adjust the gradient for such that only iron particles below a desired size are moved or separated from the sample material. The degree of separation is therefore precisely adjustable, for example, only the crude iron particles are moved out of the sample material, wherein further magnetic particles, such as magnetite, remain in the sample material.

A shield element for shielding the surroundings from the magnetic field of the magnet device is preferably arranged at least partially around the magnet device. The shield element is used in particular to reduce the leakage fields of the magnetic field and ensures a closed magnetic circuit. The shield element comprises in particular an electrically conductive shield material, for example sheet metal. The shield element is preferably formed in a ring shape and has a U-shaped cross section on the ring regions, which at least partially encloses the magnet device. The shield element is arranged at least partially around the permanent magnet or the electromagnet and prevents an interaction of the magnetic field with ferromagnetic components in particular arranged in the surroundings of the magnet device. In particular, the housing is formed as a shield element and comprises an electrically conductive shield material. The shield element preferably has a shell shape, wherein the magnet device is arranged inside the shell.

According to a further embodiment, the line is attached between the comminuting device and the press device, and therefore sample material is conducted through the line from the comminuting device to the press device.

According to a further embodiment, the magnet device is attached so it is movable in relation to the press device and/or the line. For example, the magnet device is attached so it is pivotable. The magnet device is preferably movable from a position in which iron particles are magnetizable by the magnetic field generated by means of the magnet device into a position in which the iron particles of the sample material are not magnetizable by means of the magnetic field of the magnet device.

According to a further embodiment, a vibration device is provided for vibrating the magnet device, the line, and/or the press ram. A vibration of the press ram causes a vibration of the sample material supported thereon, whereby it is thoroughly mixed. Reliable magnetization of the iron particles in the sample material by means of the magnet device is thus achieved. A vibration of the magnet device and/or the line causes, in particular after the deactivation of the magnet device, a detachment of the iron particles from the magnet device and/or the line, and therefore these are cleaned. A vibration of the line as the sample material flows throughout furthermore enables more efficient separation of the iron particles from the sample material.

According to a further embodiment, the comminuting device has a grinder device and/or a crusher device and a line for conducting the sample material is connected downstream in each case from each of the grinder device and/or the crusher device, on each of which lines a magnet device is attached. This enables a separation of a majority of the iron particles before the entry of the material into the press device.

DESCRIPTION OF THE DRAWINGS

The invention is explained in greater detail hereafter on the basis of multiple exemplary embodiments with reference to the appended figures.

Figure 1:
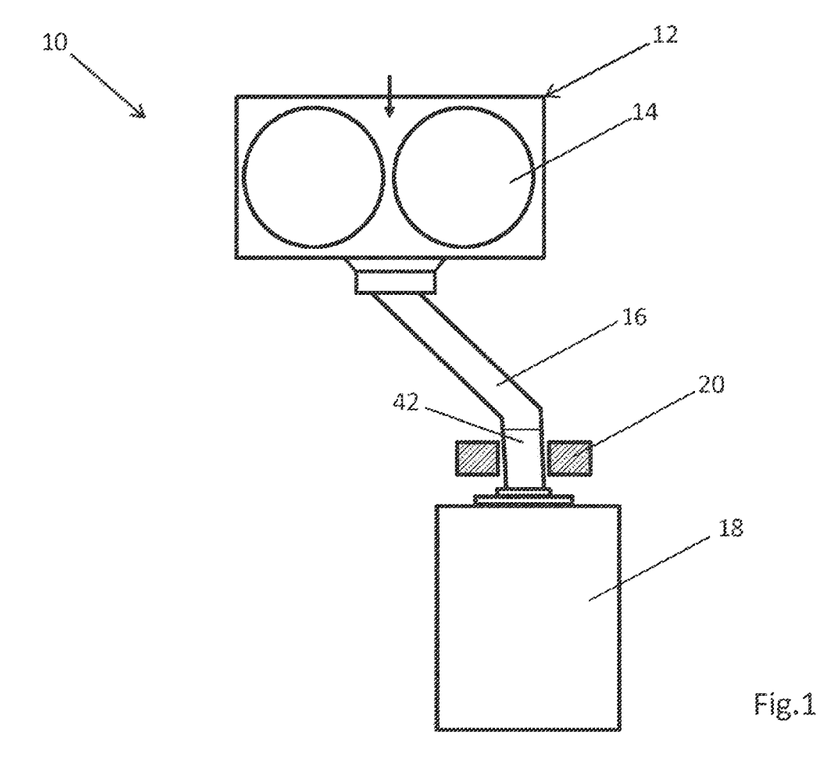
FIG. 1 shows a schematic illustration of an apparatus for preparing a sample material according to one exemplary embodiment.

FIG. 1 shows an apparatus 10 for preparing a sample material. The sample material includes, for example, ores or slags which have been taken from a mineral or steel production process. The apparatus 10 comprises a comminuting device 12 for comminuting the sample material. The comminuting device 12 is, in the exemplary embodiment shown in FIG. 1, a roller mill having two grinding rollers 14 rotating in opposite directions, which form a grinding gap for grinding the sample material. The comminuting device 12 can also be a crusher device having a grinder device connected downstream of the crusher device. The crusher device and the grinder device are connected to one another, for example, using a line for conducting the sample material.

A line 16 which conducts the ground sample material to a press device 18 adjoins the comminuting device 12 below the grinding gap. The line 16 is tubular, for example, and comprises at least one section made of a material permeable to a magnetic field, for example, silicone, PVC, ceramic, or aluminum.

The line 16 has, by way of example, a substantially vertically extending lower section 42, which forms an inlet to the press device 18. The section 42 at least partially enclosed, by way of example, by a magnet device 20. The magnet device 20 is in the form of a ring and is arranged around the line 16 in the exemplary embodiment of FIG. 1. For example, the magnet device 20 comprises a permanent magnet, which is attached so it is movable in relation to the line 16, or an electromagnet, which can be turned on and off and the magnetic field strength of which is adjustable. By means of the magnet device 20, a magnetic field can be generated, which extends inside the line 16 and interacts with the iron particles present in the sample material, such that they are magnetized. It is also conceivable not to arrange a magnet device on the line 16.

In operation of the apparatus 10 for preparing a sample material, sample material taken from a mineral or steel production process is dispensed into the comminuting device 12 in the arrow direction of FIG. 1 and comminuted therein. In particular, the sample material is not continuously taken from the mineral or steel production process, but rather supplied in batches to the comminuting device 12 in a quantity of, for example, 1-5 kg, preferably 200-500 g, in particular 25-30 g. Following the comminuting device 12, the sample material is preferably conducted as a result of gravity through the line 16 from the comminuting device 12 to the press device 18. In the substantially vertically extending section 42 of the line, the iron particles of the sample material are magnetized by means of the magnet device 20 and move in the direction of the magnet device 20 radially outward toward the inner wall of the line 16. The magnetic field generated by means of the magnet device 20 is preferably formed such that the iron particles of the sample material are held on the inner wall of the line 16 against the flow of the sample material. The remaining sample material, which contains no or only a small proportion of iron, is conducted to the press device 18 and compressed therein, for example, to form a tablet. It is also conceivable to conduct the remaining sample material, which contains no or only a small proportion of iron, not to a press device, as shown in FIG. 1, but rather, for example, to a collection container for analyzing the noncompressed sample material. Following the flow of the sample material through the line 16, the magnet device 20 is deactivated, and therefore no magnetic field is generated. The iron particles become demagnetized and fall because of gravity, for example, through the line 16. It is also conceivable to suction off or shake off the iron particles adhering to the inner wall of the line 16 after the deactivation of the magnet device, such that the line 16 is cleaned of the iron particles and clogging of the line is prevented.

The deactivation of the magnet device is to be understood to mean, for example, that in the case of a magnet device 20 comprising an electromagnet, the electromagnet is turned off, and therefore no magnetic field is generated. In the case of a magnet device 20 comprising a permanent magnet, the deactivation is understood to mean that the permanent magnet is moved away from the line 16, and therefore the magnetic field of the permanent magnet does not interact with the interior of the line and the iron particles adhering to the inner wall of the line.

The magnetic field generated by the magnet device 20 is formed in particular such that it magnetizes metallic iron particles having a size of >5 mm, preferably >1 mm, in particular >100 μm (also <100 μm) and holds them on the inner wall of the line 16 against the flow of the sample material.

The magnet device 20 is arranged on the line 16 following the comminuting device 12 solely by way of example in the exemplary embodiment of FIG. 1. It is also conceivable to conduct the sample material into the press device without separation of the iron particles.

Furthermore, it is conceivable that the comminuting device 12 comprises a crusher device and a grinder device (not shown) and a line 16 having an above-described magnet device for separation of the iron particles from the sample material is arranged in each case adjoining the crusher device and/or the grinder device, and therefore before the entry of the sample material into the press device 18, at least a part of the iron particles is separated from the sample material.

Figure 2:
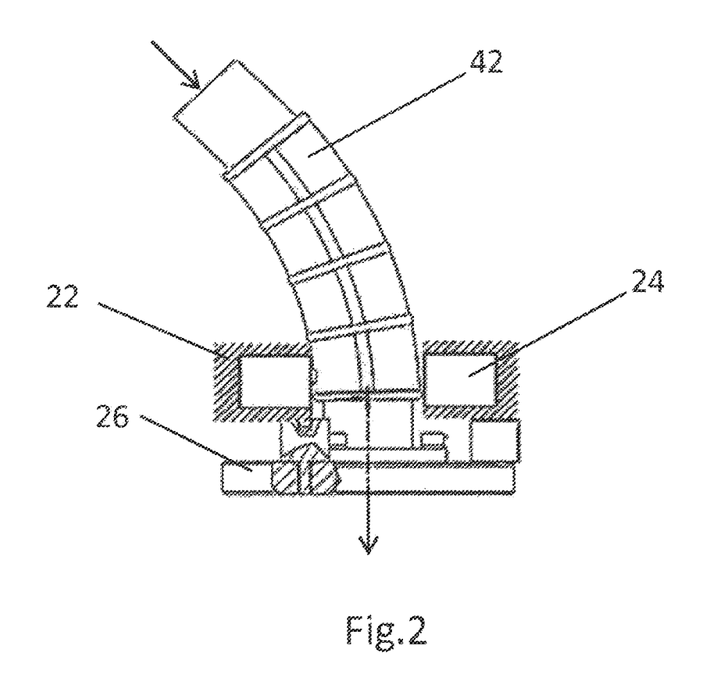
FIG. 2 shows a schematic illustration of a line having a magnet device in a sectional view according to a further exemplary embodiment.

FIG. 2 shows a section 42 of the line 16 having a magnet device 20. The section 42 comprises the outlet-side section of the line 16, which is adjoined, for example, by the press device 18 or a collection container. The magnet device 20 is arranged around a substantially vertically extending region of the section 42 and is formed in a ring shape. The magnet device 20 comprises an electromagnet 24, which has a plurality of coils (not shown), by way of example, in FIG. 2. Furthermore, a shield element 22 is arranged partially around the magnet device 20, which has an electrically conductive shield material, for example sheet metal or Fe—Co alloy (VACOFLUX) for the DC application.

The shield element 22 is arranged around the regions of the electromagnet 24 which face away from the line 16 and is formed in a ring shape in the exemplary embodiment of FIG. 1, wherein it has a U-shaped cross section in the ring region. It is thus ensured that the magnetic field only extends in the line 16 and a magnetic interaction with ferromagnetic components located in the vicinity of the line is avoided. A receptacle plate 26 may be disposed beneath the shield element 22 and the electromagnet 24.

The electromagnet 24 has at least one or a plurality of coils, the number of turns of which increases in the flow direction of the sample material, and therefore the magnetic field strength, in particular the gradient in the magnetic flux density distribution, increases radially outward and in the flow direction of the sample material, in particular opposite to gravity. The magnetic field strength and the gradient in the magnetic flux density distribution are adjustable in the electromagnet, and therefore iron particles are removable from the sample material depending on the desired size. It is also conceivable to arrange a permanent magnet around the line 16.

Such a line 16 having a magnet device as illustrated in FIG. 2 is arranged, for example, adjoining a comminuting device 12, between a crusher device and a grinder device, and/or at the material inlet of the press device 18. A grinder device or a crusher having a line 16 arranged adjoining thereon having the magnet device 20 has, for example, a bottom outlet valve, on which the line 16 adjoins.

Figure 3:
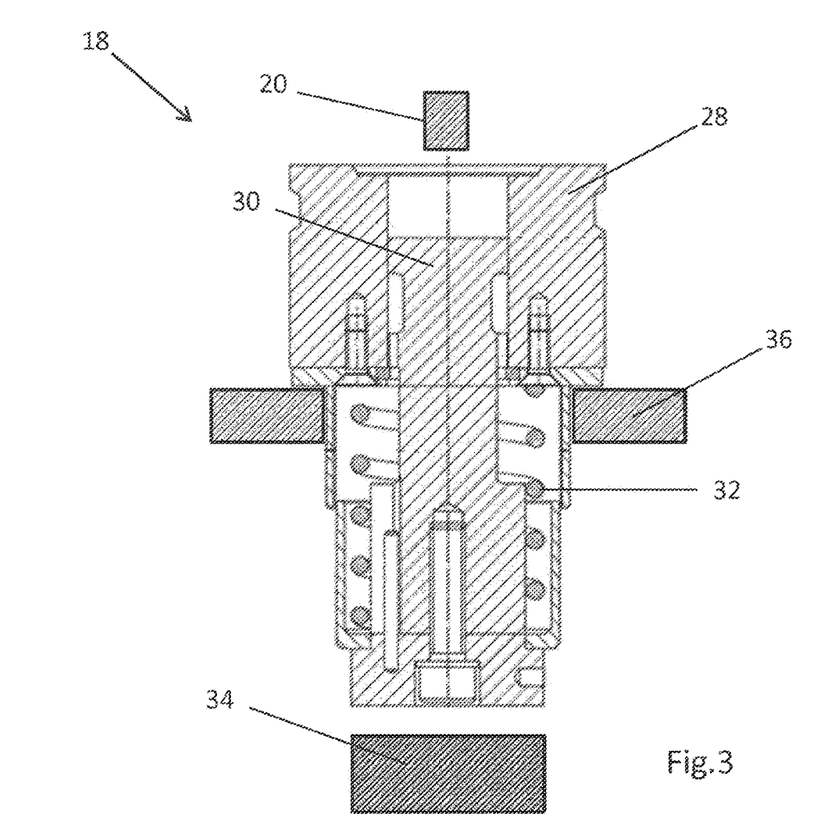
FIG. 3 shows a schematic illustration of a press device having a magnet device in a sectional view according to a further exemplary embodiment.

FIG. 3 shows a press device 18 having a magnet device 20. The press device 18 has a housing 28, in which a press ram 30 is attached so it is movable. The press ram 30 is attached so it is displaceable in the longitudinal direction of the housing 28 along the housing inner wall. A receptacle region for a sample material is formed at the head region of the press ram 30 facing toward the inlet of the press device 18.

The housing 28 of the press device 18 is fastened on a receptacle 36. The press ram 30 is connected at the end facing away from the inlet of the press device 18 to a spring 32, which is applied to the press ram 30 in the retracted position shown in FIG. 3. The press ram 30 is movable between the retracted position and a pressing position. In the pressing position, the press ram 30 is displaced upward in the longitudinal direction of the housing 28 and in relation to the housing 28 and terminates, for example, with the inlet region of the press device 18. A lifting device 34, which presses from below against the press ram 30 against the force of the spring 32 and moves the press ram 30 from the retracted position into the pressing position, is shown schematically below the press device 18.

A magnet device 20 is shown schematically above the press ram 30. The magnet device 20 comprises, for example, an electromagnet or a permanent magnet and is arranged so it is movable in relation to the housing 28 and the press ram 30.

To press a sample material to form a press tablet, the sample material is conducted into the receptacle region on the press ram 30. Subsequently thereto, the magnet device 20 is moved in the housing 28 of the press device 18 toward the sample material, and therefore the magnetic field generated by the magnet device 20 interacts with the sample material and the iron particles within the sample material are magnetized. The iron particles are attracted by the magnet device 20 and remain adhering thereon. The magnetic field generated by the magnet device 20 is formed in particular such that it magnetizes metallic iron particles having a size of >5 mm, preferably >1 mm, in particular >100 µm (also <100 µm) and these adhere to the magnet device. Subsequently, the magnet device 20 having the iron particles adhering thereon is moved away from the press device 18. The remaining sample material, which contains no or only a small proportion of iron, is subsequently compressed to form a press tablet.

Figure 4:
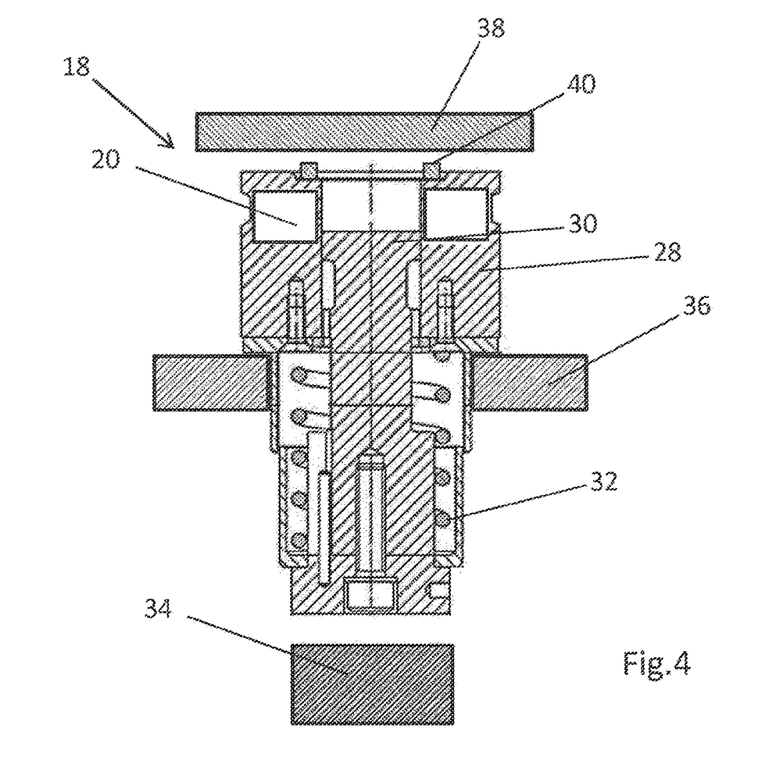
FIG. 4 shows a schematic illustration of a press device having a magnet device in a sectional view according to a further exemplary embodiment.

FIG. 4 shows a press device 18, which corresponds to the press device 18 of FIG. 3, with the difference that the magnet device 20 is arranged in the housing 28 of the press device 18. In addition, a ring 40 is provided, which is arranged around the inlet region of the press device. A schematically shown counter pressure plate 38 is arranged above the press device 18. The magnet device 20 has, for example, a permanent magnet or an electromagnet. In particular, a shield element (not shown) is arranged at least partially around the magnet device 20, which essentially corresponds to the shield element 22 of FIG. 2.

The magnet device 20 is formed in a ring shape and is arranged around the receptacle region on the head of the press ram in the retracted position of the press ram 30. In the pressing position of the press ram 30, the magnet device is arranged such that the head of the press ram 30, in particular the region on which the sample material is received, is magnetized, and therefore the iron particles located in the sample material are moved in the direction of the press ram 30 and accumulate in the lower region of the sample material facing toward the press ram 30. The magnetic field generated by the magnet device 20 is formed in particular such that it magnetizes metallic iron particles having a size of >5 mm, preferably >1 mm, in particular >100 µm (also <100 µm) and these accumulate at the lower peripheral region of the sample material facing toward the press ram 30. The strength of the magnetic field of the magnet device 20 is preferably adjustable. The sample material is compressed to form a tablet following the displacement of the iron particles within the sample material. In this case, the press ram is moved in the direction of the counter pressure plate 38, and therefore the sample material is compressed between the receptacle region on the head of the press ram 30, the ring 40, and the counter pressure plate 38.

It is also conceivable to arrange the magnet device 20 such that it magnetizes the counter pressure plate 38, in particular in the region of the contact surface of the steel ring, and/or the ring 40. The iron particles of the sample material are displaced in the direction of the magnetized counter pressure plate 38 and/or in the direction of the magnetized ring 40, and therefore they accumulate in the peripheral regions of the sample material. The compressed tablet therefore only has iron particles in the peripheral regions of the tablet on the top, bottom, or in a ring shape on the lateral regions of the tablet. These particles do not influence the following analysis methods, which are carried out using the press tablet, at these positions.

LIST OF REFERENCE NUMERALS 10 apparatus for preparing a sample material
12 comminuting device
14 grinding rollers
16 line
18 press device
20 magnet device
22 shield element
24 electromagnet
26 receptacle plate
28 housing
30 press ram
32 spring
34 lifting device
36 receptacle
38 counter pressure plate
40 ring
42 section of the line

The invention claimed is:

1. A method of preparing a sample material from a mineral or steel production process, comprising the following steps:
   comminuting the sample material in a comminuting device,
   supplying the sample material to a press, wherein the sample material is received on a press ram of the press,
   generating a magnetic field and magnetizing iron particles contained in the sample material in the press ram with a magnet, such that the iron particles accumulate in a region within the sample material arranged in the press ram facing toward the magnet, and
   pressing the sample material to form a tablet.

2. The method of claim 1, wherein said generating comprises the plunging of the magnet into the sample material.

3. The method of claim 1, wherein the press ram of the press is magnetized by the magnet and the iron particles of the sample material accumulate in the peripheral region of the sample material facing toward the press ram.

4. The method of claim 1, wherein the magnet is moved from a position outside the press into a position inside the press before said generating.

5. The method of claim 1, wherein a line for conducting the sample material is connected downstream of the comminuting device and a further second magnet is attached on the line and wherein the method comprises:
   conducting the sample material following the comminuting device through the line and accumulating the iron particles of the sample material on a wall region of the line.

6. The method of claim 5 comprising vibrating at least one of the second magnet, the press, or the line.

7. The method of claim 6, wherein the sample material is vibrated.

8. The method of claim 1, wherein the comminuting device comprises a crusher device and/or a grinder device and wherein a line for conducting the sample material having a second magnet is connected downstream from the crusher device and/or the grinder device and wherein the sample material is conducted through the line following the grinder device and/or the crusher device and the iron particles are removed from the sample material.

9. The method of claim 1, wherein the sample material is analyzed by means of an x-ray fluorescence analysis and/or an x-ray diffractometry analysis following said generating.

10. The method of claim 1 comprising:
  acquiring the sample material from the mineral or steel production process, with the sample material being a slag or an ore;
  causing the iron particles to accumulate in the region of the sample material such that the iron particles are distributed heterogeneously throughout the sample material as a result of the magnetic field; and
  removing the iron particles from the sample material.

11. The method of claim 1 wherein generating the magnetic field to accumulate the iron particles in the region causes a proportion of the iron particles relative to other particles in the sample material to increase in the region.

12. The method of claim 1 comprising reducing a proportion of the iron particles in the sample material by removing at least some of the iron particles from the region after the iron particles are accumulated by the magnetic field.

13. An apparatus for preparing a sample material from a mineral or steel production process, having:
  at least one comminuting device for comminuting the sample material,
  a press for pressing the sample material connected downstream of the comminuting device, the press including a press ram configured to receive the sample material, wherein the press has a housing and the press ram arranged movably inside the housing between a retracted position and a pressing position, and
  a ring and a counter pressure plate configured to cooperate with the press ram in a pressing position, and
  a magnet configured to magnetize at least one of the press ram, the ring, or iron particles contained in the sample material in the press and thereby cause the iron particles in the sample material to accumulate in a peripheral region within the sample material.

14. The apparatus of claim 13, wherein said pressing forms a tablet.

15. The apparatus of claim 13, wherein the magnet comprises a permanent magnet or an electromagnet.

16. The apparatus of claim 13, wherein the magnet is arranged in the housing or on the counter pressure plate.

17. The apparatus of claim 13, wherein a line for conducting the sample material is connected downstream of the comminuting device and wherein a second magnet is attached on the line.

18. The apparatus of claim 17, wherein at least one magnet is attached so it is movable in relation to the press and the line.

19. The apparatus of claim 17, wherein a vibration device is provided for vibrating the second magnet, the line, and/or the press ram.

20. An apparatus for preparing a sample material from a mineral or steel production process, having:
  at least one comminuting device for comminuting the sample material,
  a press for pressing the sample material connected downstream of the comminuting device, the press including a press ram configured to receive the sample material, wherein the press has a housing and the press ram arranged movably inside the housing between a retracted position and a pressing position, and
  a ring and a counter pressure plate configured to cooperate with the press ram in a pressing position, and
  a magnet configured to magnetize at least one of the counter pressure plate or the ring and thereby cause iron particles in the sample material to accumulate in a peripheral region of the sample material.

* * * * *